United States Patent
Wan et al.

(10) Patent No.: US 8,516,325 B2
(45) Date of Patent: *Aug. 20, 2013

(54) METHOD AND ARRANGEMENT FOR HARQ IN WIRELESS MULTI-CARRIER SYSTEMS

(75) Inventors: Lei Wan, Beijing (CN); Jung-Fu Cheng, Cary, NC (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 13/524,284

(22) Filed: Jun. 15, 2012

(65) Prior Publication Data

US 2012/0254682 A1 Oct. 4, 2012

Related U.S. Application Data

(63) Continuation of application No. 12/159,730, filed as application No. PCT/SE2005/002070 on Dec. 30, 2005, now Pat. No. 8,205,127.

(51) Int. Cl.
*G06F 11/00* (2006.01)

(52) U.S. Cl.
USPC ............. 714/748; 714/749; 714/750

(58) Field of Classification Search
USPC ............................... 714/748–751
See application file for complete search history.

(56) References Cited

U.S. PATENT DOCUMENTS

| | | | |
|---|---|---|---|
| 6,671,849 B2 * | 12/2003 | Tripathi et al. | 714/746 |
| 6,691,273 B2 | 2/2004 | Wager et al. | |
| 7,047,473 B2 * | 5/2006 | Hwang et al. | 714/751 |
| 7,512,860 B2 | 3/2009 | Miyazaki et al. | |
| 8,205,127 B2 * | 6/2012 | Wan et al. | 714/748 |
| 8,429,481 B2 * | 4/2013 | Lohr et al. | 714/751 |
| 2002/0168945 A1 | 11/2002 | Hwang et al. | |
| 2005/0097425 A1 * | 5/2005 | Golitschek et al. | 714/749 |
| 2005/0249296 A1 | 11/2005 | Axnas et al. | |

(Continued)

FOREIGN PATENT DOCUMENTS

| | | |
|---|---|---|
| WO | WO 2005/062467 A1 | 7/2005 |
| WO | WO 2005/062497 A1 | 7/2005 |
| WO | WO 2005/078976 A1 | 8/2005 |

OTHER PUBLICATIONS

Ding, Quan-Long, Performance of a Hybrid Multilevel Error Control with an Early-Stop ARQ Protocol for Wireless ATM Networks, Mar. 2003, IEEE Transactions on Communications, vol. 51, No. 3, p. 495.

(Continued)

*Primary Examiner* — Marc Duncan

(57) ABSTRACT

A communication method in a receiving node in a wireless communication system includes receiving, at a receiving node, a first coded message block that includes a plurality of parts distributed over a plurality of components. The method further includes detecting a decoding error associated with decoding the received first coded message block and, in response to detecting the decoding error, identifying a part of the first coded message block for which retransmission will be requested and a suggested retransmission setting. The suggested retransmission setting includes one or more of a component selection setting, a link adaptation setting, a power control setting, and a scheduling setting. The method also includes feeding back to the sending node feedback information indicating that the first coded message block could not be correctly decoded. The feedback information indicates the identified part of the first coded message block and the suggested retransmission settings.

53 Claims, 5 Drawing Sheets

(56) References Cited

U.S. PATENT DOCUMENTS

| | | |
|---|---|---|
| 2005/0251721 A1 | 11/2005 | Ramesh et al. |
| 2006/0200722 A1 | 9/2006 | Braun |
| 2007/0245203 A1* | 10/2007 | Cho et al. .................. 714/748 |
| 2008/0276148 A1 | 11/2008 | Lohr et al. |
| 2009/0031183 A1* | 1/2009 | Hoshino et al. ............. 714/748 |
| 2009/0150738 A1 | 6/2009 | Nishio et al. |
| 2009/0319854 A1 | 12/2009 | Qian et al. |
| 2010/0017675 A1* | 1/2010 | Ihm et al. ................... 714/751 |
| 2011/0161766 A1* | 6/2011 | Malkamaki et al. .......... 714/748 |

OTHER PUBLICATIONS

A Yanoglu, E: "Adaptive ARQ/FEC for multilane transmission in wireless networks". Global Telecommunications Conference, 1995. GLOBECOM '95., IEEE, vol. 3, No. pp. 2278-2283, Nov. 14-16, 1995.

* cited by examiner

METHOD AND ARRANGEMENT FOR HARQ IN WIRELESS MULTI-CARRIER SYSTEMS

CROSS-REFERENCE TO RELATED APPLICATIONS

This application is a continuation of International Application No. PCT/SE2005/002070, filed on Dec. 30, 2005, which corresponds to the national-stage entry U.S. application Ser. No. 12/159,730, filed Jul. 17, 2008, the contents of which are hereby incorporated by reference herein.

FIELD OF INVENTION

The present invention relates to Hybrid Automatic Repeat reQuest (HARQ) in wireless communication systems. In particular, the present invention relates to the use of HARQ over fluctuating radio channels.

BACKGROUND OF THE INVENTION

In most communication systems, and in particular wireless communication systems, it is of outmost importance to provide a reliable protocol for delivering data units from one entity to at least another entity in the system, without loss of data and without duplication of data. Such reliable data delivery protocols typically rely on the principle that the receiver of the data responds to the sender of the data with acknowledgements upon reception of the data and/or negative acknowledgements if the data units were lost. The sender will subsequently to the acknowledgement send the next data unit, or in the vent of a negative acknowledgement, retransmit the lost data unit.

Automatic repeat request (ARQ) is one of the most common retransmission techniques in communication networks, and ensures reliable user data transfer and data sequence integrity. The data is, prior to the transmission, divided into smaller packets, protocol data units (PDU). A reliable transfer is enabled by encoding packets with an error detecting code, such that the receiver can detect erroneous or lost packets and thereby order retransmission. The data sequence integrity is normally accomplished by sequential numbering of packets and applying certain transmission rules.

In the simplest form of ARQ, commonly referred to as Stop-and-Wait ARQ, the sender of data stores each sent data packet and waits for an acknowledgement from the receiver of a correctly received data packet, by way of an acknowledgement message (ACK). When the ACK is received, the sender discards the stored packet and sends the next packet. An example of a prior art Stop-and-Wait ARQ scheme is schematically depicted in the message sequence chart of FIG. 1a. The process is typically supplemented with timers and the use of negative acknowledgement messages (NACK), which is illustrated in FIG. 1b. The sending entity uses a timer, which is started on the transmission of a data packet, and if no ACK has been received before the timer expires the data packet is retransmitted. If the receiver detects errors in the packet it can send a NACK to the sender. Upon receiving the NACK, the sender retransmits the data packet without waiting for the timer to expire. If the ACK or NACK message is lost, the timer will eventually expire and the sender will retransmit the data packet. From the simple Stop-and-Wait, more elaborated schemes of the conventional ARQ has been developed, for example Go-Back-N and Selective Reject (or Selective Repeat), which provides a higher throughput. Taught in WO 02/09342 by Dahlman et al. is a ARQ scheme that adds flexibility to the traditional ARQ scheme by introducing ARQ parameters that are set and/or negotiated to give a desired benefit in regard to communication resources.

In another line of development of the ARQ, the redundancy in the coding is exploited in various ways to enhance communication performance (generally measured as throughput). These schemes are referred to as Hybrid ARQ schemes. The fundamentals of Hybrid ARQ are described in "Error Control Coding: Fundamentals and Applications" by Shu Lin and Daniel J. Costello, Prentice Hall, 1983, pp 477-494. Due to the combination of coding and ARQ, the hybrid ARQ schemes can give a certain adaptation to changes in the radio environment, e.g. to fading. How to best combine ARQ and coding schemes to cope with fading channels is not trivial. Several approaches and schemes have been suggested and used.

Recent developments of the HARQ protocols include Chase combining and incremental redundancy approaches, and are described in "Performance comparison of HARQ with Chase combining and incremental redundancy for HSDPA" by Frenger, P., Parkvall, S., Dahlman, E., VTC 2001 Fall. IEEE VTS 54th, Volume: 3, 7-11, Oct. 2001, pp 1829 1833 vol. 3. In the Chase combining scheme, HARQ-CC, also referred to as Type I HARQ, the same bit sequence as that used in the initial transmission is also used for the retransmission, and the receiver always combines the full retransmission of the failed block. Note that the amount of buffered coded bits in the receiver buffer remains the same. In the incremental redundancy schemes HARQ-IR, also referred to as Type II HARQ, the retransmission introduces new coded bits to the previous transmitted blocks. That is, the amount of data to be buffered in the receiver increases with consecutive retransmissions. Two alternative schemes are considered for the incremental redundancy, systematic priority and parity priority.

It is in the art recognised that HARQ schemes typically are sensitive to changes and fluctuations in the radio environment, for example the fluctuations in a channel as regards to signal strength due to Rayleigh fading or unpredictable interference variations. The channel fluctuation may further cause inaccuracies in channel measurements and/or that outdated channel measurements are used for link mode selection. This may cause packets to be sent with a rate that is not decodable if the interference and noise is greater than permitted for the selected rate. Alternatively, a margin may be introduced and a reduced rate used, but this is done at the "cost" of not efficiently using the channels that can bear a higher rate. U.S. Pat. No. 6,101,168 describes a method and arrangement providing some adaptation to changes in the channel by symbol accumulation in the receiver. The data not correctly received is retransmitted concurrently with new data, but at a different code rate and/or at a different power levels.

Wireless communication systems utilizing a plurality of components for the transmission of a single message, for example Orthogonal Frequency Division Multiplexing (OFDM) systems, put additional requirements on a retransmission scheme. In such system, a forward error correction (FEC) codeword is carried by multiple components of varying channel quality states. Therefore, several difficulties in maintaining reliable retransmission are present:

Multi-state channel quality variation causes an inherent loss in the transmission. A codeword over a multi-state channel with a high degree of variations requires higher operating signal to noise ratio, SNR, for the same target quality (block error rate, BLER, for example) as compared with a multi-state channel with a lower degree of variations.

For components, or channel states, with low quality, channel estimation is more prone to errors. With bad channel estimates, the inclusion of low-quality components effectively subtracts energy from better-quality components.

For turbo codes, wide channel quality variation could significantly erase systematic bits. Without enough systematic bits the turbo decoder fails.

By not taking the above difficulties into account the prior art HARQ protocols exhibit the drawbacks:

HARQ-CC always retransmits identical coded bits;

HARQ-IR with parity priority always retransmits new coded bits of the same size. Furthermore, it does not correct systematic bit erasure problems;

HARQ-IR with systematic priority retransmits the complete systematic bits and some new coded bits to fill up the size.

Consequently, wasteful use of valuable radio resources cannot be avoided. In addition, the prior art HARQ protocols do not focus on the problem caused by the multi-state channel.

SUMMARY OF THE INVENTION

Obviously an improved HARQ method, that quickly and automatically adapts to channel quality changes in wireless communication systems utilizing a plurality of components, for example Orthogonal Frequency Division Multiplexing (OFDM) systems, is needed.

The object of the present invention is to provide a method and arrangement that overcome the drawbacks of the prior art techniques. This is achieved by the method as defined in claim 0, the method in a sending node as defined in the independent claims.

In the method according to the present invention a sender and a receiver are engaged in wireless communication with each other, wherein the sending node transmits, to the receiving node, a coded message block comprising a plurality of parts distributed over a plurality of components. According to the invention an equalizing HARQ method is introduced. The equalizing HARQ identifies and retransmits the most distorted parts of a received coded message block. In addition, the retransmitted parts can optionally be relocated to components of higher quality, which ensures good retransmission quality for those badly distorted parts in the prior transmission(s). After a soft combination in the receiving node, by either combining the first transmitted distorted parts and its retransmission or substituting the first transmitted distorted parts with its retransmission, the final received codeword experience an equalized quality variation with enhanced robustness.

A preferred embodiment of method comprises the steps of:

identifying that a received first coded message block could not be correctly decoded, and identifying at least one part of the first coded message which has probably contributed to decoding error, and the component associated with said part;

the receiving node feeding back to the sending node at least an indication that the first coded message block could not be correctly decoded; and the sending node retransmitting selected parts of the first coded message block in a second coded message block to the receiving node.

A sending node according to the invention is adapted to transmit coded message blocks comprising a plurality of parts distributed over a plurality of components. The sending node comprises radio communication means, a feedback reception module adapted to receive feedback information from a receiving node, said feedback indicating if a coded message block was received in error, and a retransmission settings module in connection with the feedback reception module. The retransmission settings module is adapted to determine which of the parts of a message block that should be retransmitted based at least partly on a feedback provided from the feedback reception module.

A receiving node according to the invention is adapted to receive coded message blocks comprising a plurality of parts distributed over a plurality of components. The sending node comprises radio communication means, a decoding module in connection with the radio communication means, a quality measurement module and a feedback module in connection with the decoding module and the quality measurement module adapted to provide quality indicators for each component. The decoding module is adapted to provide an error indication if a received coded message block could not be decoded, and the feedback module is adapted to feed back to a sending node quality indicators provided from the quality measurement module upon receiving an indication of a decoding error from the decoding module.

Thanks to the equalizing HARQ according to the present invention, a communication method that quickly and automatically adapts to channel quality changes can be implemented in wireless communication systems utilizing a plurality of components, for example Orthogonal Frequency Division Multiplexing (OFDM) systems One advantage with the method according to the invention is that it provides individual channel-dependent link-adaptation for the retransmission with different modulation mode and transmitted power (if permitted) to enhance the reliability of retransmissions.

A further advantage is that the equalizing HARQ provides more flexibility of adaptation than the conventional HARQ, by incorporating retransmission adaptation to minimize unnecessary radio resource consumption.

A yet further advantage is that there is no fixed limit to the packet size in the retransmission, consequently more flexibility is permitted in the resource allocation of the retransmission.

Embodiments of the invention are defined in the dependent claims. Other objects, advantages and novel features of the invention will become apparent from the following detailed description of the invention when considered in conjunction with the accompanying drawings and claims.

BRIEF DESCRIPTION OF THE DRAWINGS

The invention will now be described in detail with reference to the drawing figures, wherein FIGS. 1 a) and b) are message sequence charts of conventional prior art ARQ schemes.

DETAILED DESCRIPTION OF THE INVENTION

Figure 1A:
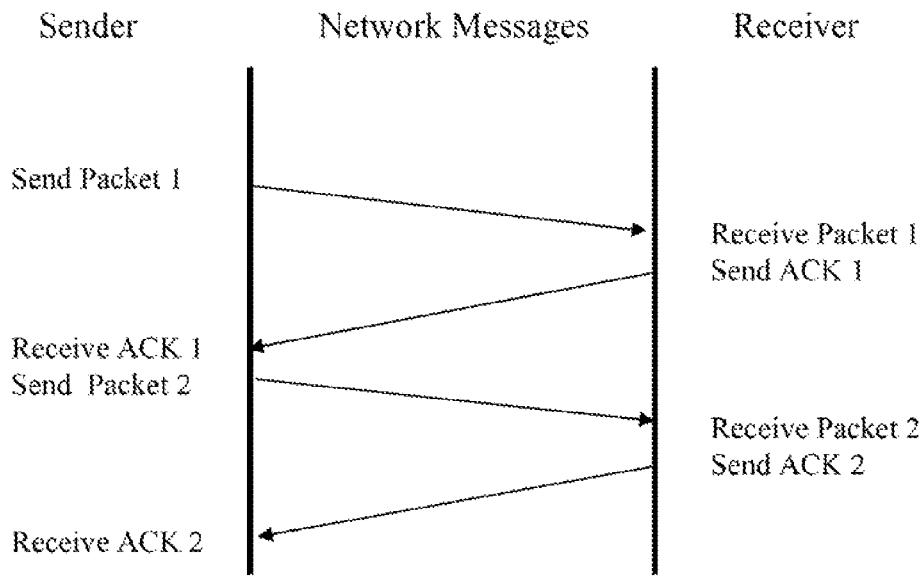
Figure 1B:
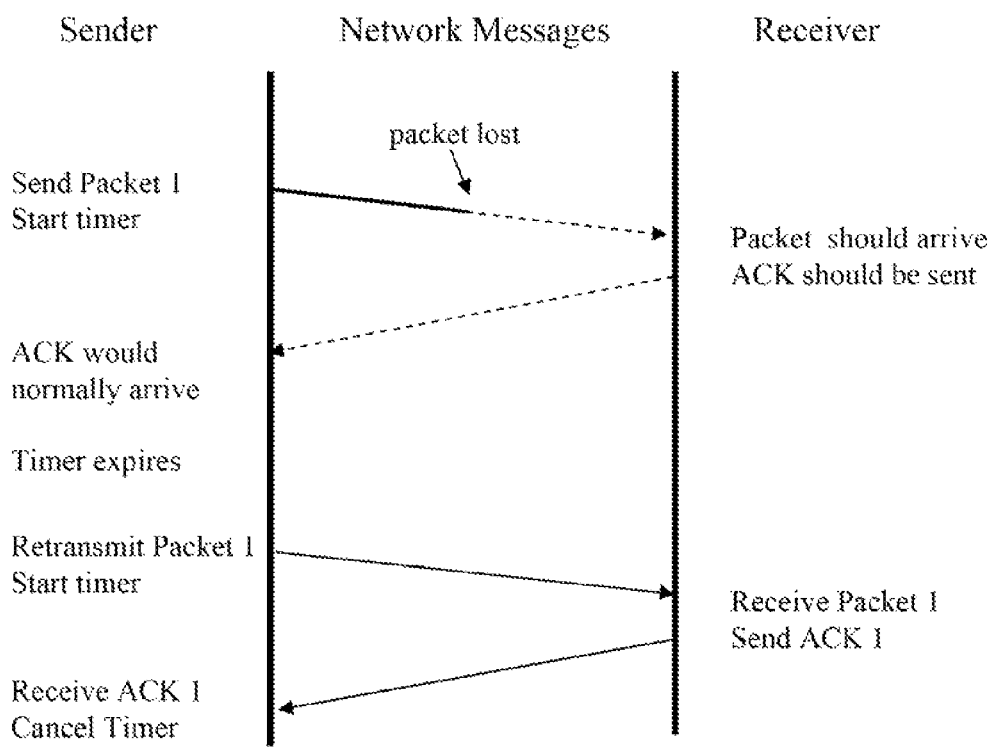

In a typical scenario for using HARQ, two or more entities, or nodes, are engaged in wireless communication with each other. The communication is commonly referred to as being over a radio channel, which for example is a logical channel in a wireless communication system such as UMTS, or over a plurality of sub-carriers in a multi-carrier system such as OFDM. The nodes are capable of both transmitting and receiving radio signals. For the clarity of the description, the node that is to transmit data is referred to as the sending node, and the node that is to receive the data is referred to as the receiving node, even though in the HARQ processes both nodes receive and transmit signals over the radio channel. The nodes may for example be a radio base station, a mobile station, user equipment of various kinds: such as laptop computers, PDAs, cameras, video/audio players and game pads provided with radio communication abilities, a vehicle or a stationary machine.

Multi-carrier systems are characterised by a plurality of identifiable/indexable components over which a message is distributed. In for example OFDM, wherein the available frequency spectrum is divided into a large plurality of sub-carriers of comparably narrow frequency range, a component can be seen as a certain timeslot of a certain sub-carrier (frequency), or set of sub-carriers. In multi-carrier CDMA a component may be associated with a certain timeslot and/or a specific direct sequence code. How a component is identified depends on the communication/transmission system, and is typically specified in the standards regulating the system.

In the multi-carrier systems wherein the method and arrangement according to the invention are applicable, a coded message block, i.e. the FEC codeword, is typically modulated and spread over the components. Hence, the coded message block will be transmitted in parts associated with the different components. A substantial portion of the parts of the coded message block is needed for the receiving node to correctly decode the coded message block.

The term coded message block used hereinafter is to be given a broad interpretation, as the structure and format may vary between different communication systems. A system may support a variety of different formats.

As discussed in the background section, fading fluctuations and interference fluctuations caused by traffic variations, may cause the channel quality to change unpredictably. Considering a system with a coded message block transmitted in a multi-carrier system, e.g. a code block spread among multi-carriers in OFDM system experiences frequency-domain multi-channel-states, parts of the code block may experience low transmission quality, occasionally at such a low quality that the coded bits of a component will be severely distorted. Hence, parts of the coded message block, corresponding to the parts transmitted on the components of low quality, will be lost or severely distorted, possibly causing the receiving node to be unable to decode the coded message block.

According to the present invention an equalizing HARQ method is introduced. The equalizing HARQ detects and retransmits the most distorted parts of a received coded message block. In addition, the retransmitted parts can optionally be relocated to components of higher quality, which ensures good retransmission quality for those badly distorted parts in the prior transmission. After a soft combination in the receiving node, by either combining the first transmitted distorted parts and its retransmission or substituting the first transmitted distorted parts with its retransmission. The final received codeword experience an equalized quality variation with much less multi-state performance loss. The method does not suffer from the systematic bit erasure problem.

To minimize unnecessary radio resource consumption, the method according to the invention does not automatically retransmit the complete coded message block nor all systematic bits. The retransmission packet size depends on the quality measurement of the previous transmissions, the quality requirement and the available resource in the subsequent transmission, etc. Furthermore, the identified distorted parts, or distorted coded bits, to be retransmitted, can optionally be mapped to different modulations than those used in previous transmissions. Hence the method according to the invention supports a very flexible retransmission adaptation.

Figure 2:
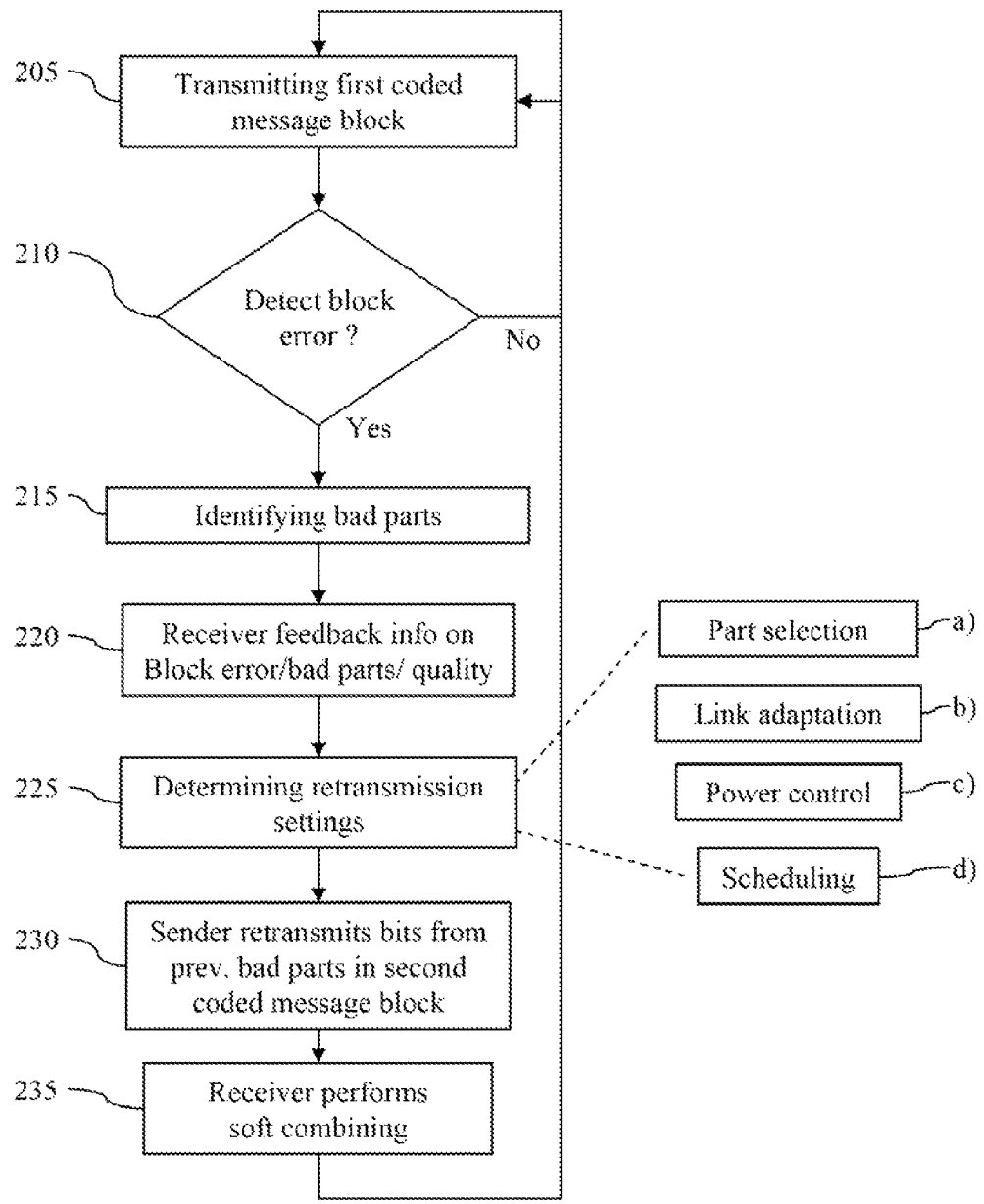
FIG. 2 is a flowchart over the method according to the present invention.
Figure 3:
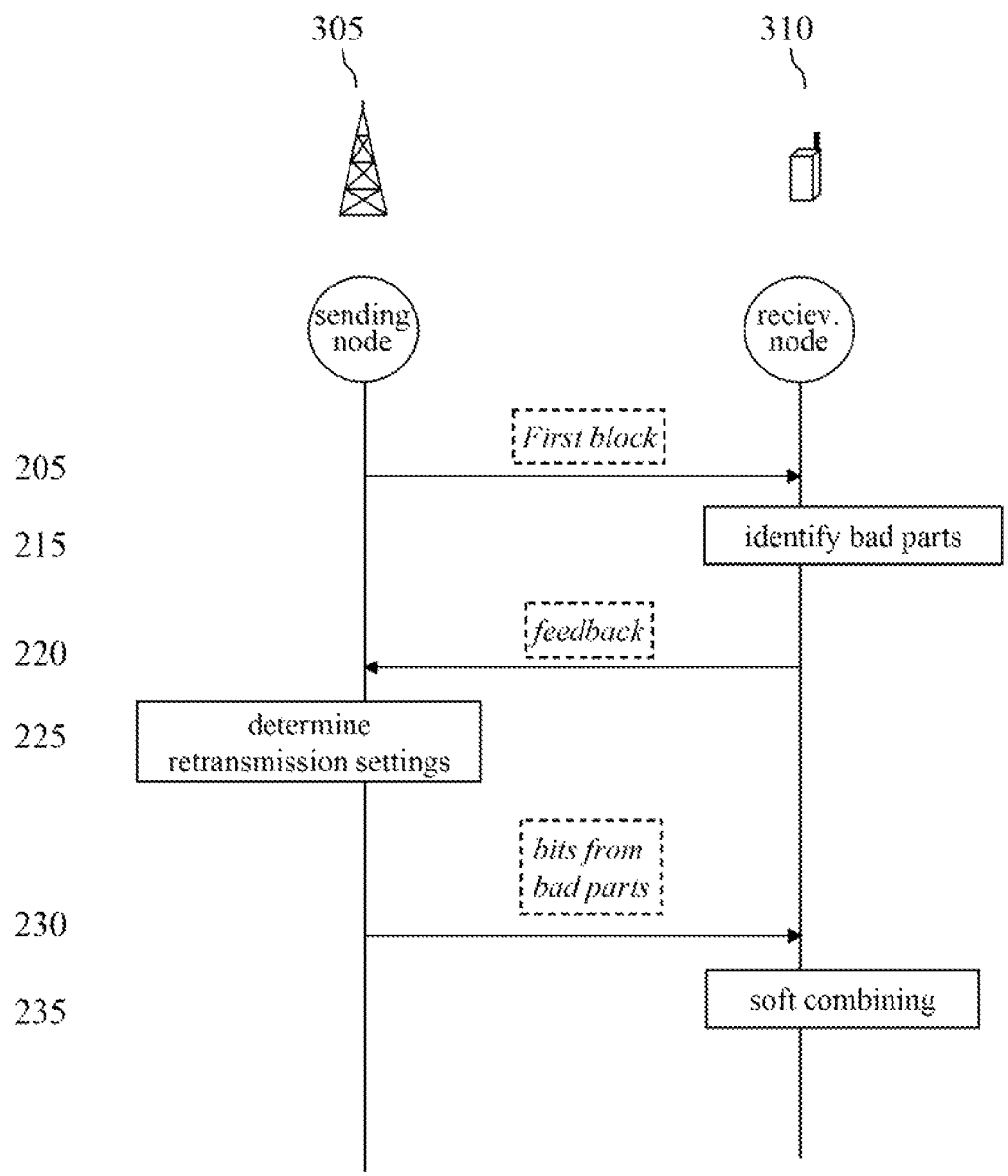
FIG. 3 is a message sequence chart of the method according to the present invention.

The method according to the invention will be described with reference to the flowchart of FIG. 2 and the schematic signalling scheme of FIG. 3, and comprises the steps of:

205: The sending node 305 transmitting a first coded message block over a plurality of components to a receiving node 310.

210: If the receiving node, after having received the first coded message block, is incapable of decoding the message block, a retransmission adaptation process will be initiated. The detection of errors may be performed by the uses of a block-error indicator (BEI) indicating an un-correctable block. The received first coded message block is stored by the receiving node. If no errors were detected, the receiving node is ready for receiving further message blocks.

215: In the retransmission adaptation process the identification of which parts of the first coded message block that are the most likely to have caused the block error is based on component quality measurements or predictions. The quality measurements include, but are not limited to SINR and symbol information rates. One or more quality measurements and/or predictions are used to determine quality indicators for each component. Different alternative implementations, corresponding to different embodiments are possible:

215a: The receiving node performs quality measurements on the received signal, for example SINR or symbol information rates, to determine a quality indicator for each component, associated with a specific part of the received first message block. The components are preferably sorted based on their respective quality indicator and parts associated with components with a received quality indicator below a quality threshold value are identified as bad parts.

215b: The sending node predicts the quality of the components, for example based on the channel quality response of previous transmissions, denoted as predicted quality indicators, for each component. The parts associated with a predicted quality indicator below a quality threshold value are identified as bad parts.

220: The receiving node feeds back information to the sending node. Depending on the implementation/embodiment the feedback may be explicit or reduced:

220a: In the case of the receiving node determining the component quality indicators the receiving node may feed back explicit request information identifying the parts to be retransmitted. Alternatively, the receiving node feeds back the component quality indicators.

220b: In the case of the sending node determining the component quality indicators, the receiving node feeds back only an indication of an un-correctable received coded message block.

225: The sending node determines retransmission settings at least partly based on the feedback information. Optionally new coded bits are included in the transmission.

230: The sending node retransmits the identified coded bits in a second coded message block.

235: Upon reception of the second coded message block, the receiving node performs a combining of at least part of the previously stored first coded message block and the retransmitted parts to facilitate the decoding of the first coded message block. The combining may be a soft bit combining or alternatively on the symbol level. A selective combination can be introduced by discarding soft values from parts with very bad quality of the first coded message block. The parts to exclude are identified as parts with their associated components having quality indicators below an exclusion threshold value. Alternatively, the parts are sorted according to the quality indicators and a predetermined or dynamically selected number of the worst parts are excluded.

The steps of the method are typically repeated for each transmission, i.e. a retransmission, or the soft-combined block based on all the previous received transmissions, can be seen as a first transmission as viewed from a subsequent transmission.

The step of identifying a decoding error, step 210, may for example comprise error detection coding and the use of cyclic redundancy check (CRC) bits. Alternatively, if iterative decoders are used, preferably early stopping methods are used.

The determination of quality indicators, step 215, can be based on most of the numerous quality measures known in the art. It is also possible to use a plurality of different quality measures in the determination of the quality indicators. The Channel Quality Indicator CQI as described in PCT/SE2004/001575L having the same applicant as the present application, provides a method of determining quality indicators suitable for the method of the present invention.

Figure 4:
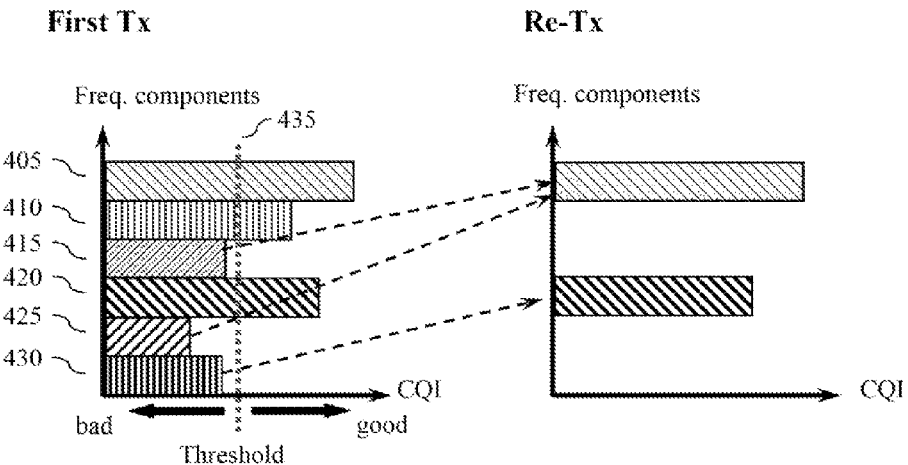
FIG. 4 is a schematic illustration of the chunk selection procedure according to the present invention.

The quality threshold value may be a predetermined value or a dynamical value. In a preferred embodiment the quality threshold value is dynamical and determined by the sending node based on the component quality indicators comprised in the feedback from the receiving node. Illustrated in FIG. 4 is a first coded message block, transmitted over components 405-430. As illustrated components 415, 425 and 430 have channel quality indicators that did not reach the quality indicator threshold value, indicated with the dashed line 435, and the parts of the coded message block associated with these components will be retransmitted, in the illustrated example on components 405 and 420. If the quality threshold value is dynamic and determined by the sending node, the sending node informs the receiving node of the quality threshold value. From this knowledge, and the previously determined channel quality indicators, the receiving node can extract which parts of the coded message block that the sending node will retransmit.

The determination of retransmission settings in step 225 preferably comprises taking into account not only the HARQ feedback but also a plurality of other transmission parameters. The determination is preferably based on at least the quality requirement, quality measurement, and/or the channel predictions. As shown in FIG. 4a-b parts 410, 415 and 420 of the first coded message block 405 that did not reach the quality indicator threshold will be retransmitted. The bad parts may for example, often preferably, be relocated to the components with good channel quality, which are not necessarily the same as in the first transmission. The selection of components for the retransmission of the bad parts and the scheduling of the next transmission should preferably relate to each other closely. When there is not enough resource for the coming retransmission, fewer components can be selected.

Figure 5:
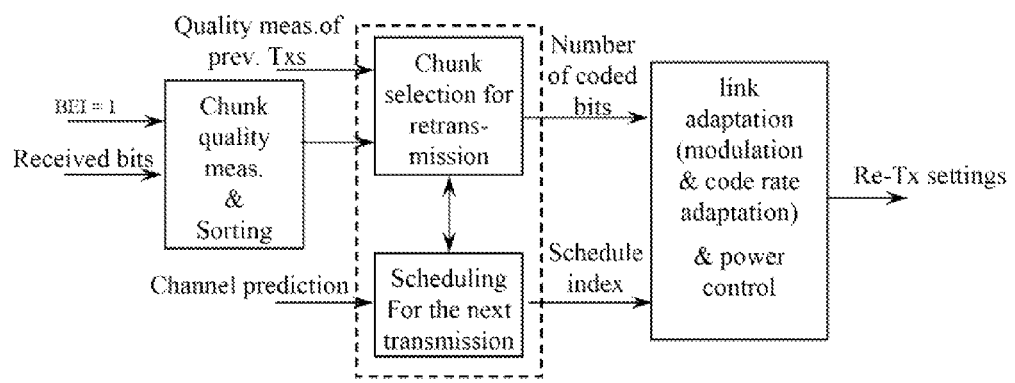
FIG. 5 is a schematic view of the interactions of different functions/procedures according to the present invention.

The step of determining retransmission settings is preferably a procedure taking a plurality of different factors into account, including, but not limited to, component selection, link adaptation, scheduling and power control. The factors, further described below, typically and preferably rely on each other. Their inputs and interactions are further illustrated in FIG. 5.

a: Component selection—the coded bits associated with the bad parts are preferably relocated to components with an expected better quality, wherein the selection is at least partly based on the feedback and on scheduling considerations.

b: Link adaptation—the modulation mode and or code rate can be adapted to the channel condition, instead of taking the mode/code in the previous transmissions, which helps to improve the re-transmission efficiency and quality. The link adaptation is performed together with the component selection and/or the channel predictions of the allocated components in the next transmission. The feedback from the receiving node may comprise link adaptation parameters, and a change of modulation/code rate is initiated either based on the channel quality estimations or predictions, or based on the size of the allocated resource (e.g. by selecting a lower and more robust modulation mode among those which can fill the same allocated components).

c: Power control—if needed the transmission power for the retransmission can be adjusted. The power control is performed together with the link adaptation, the component selection and the channel prediction of the allocated components in the next transmission.

d: Scheduling—the coded bits to retransmit and possibly also new bits from an incoming data stream is scheduled for the next transmission.

One or more of the above factors for the retransmission settings may be determined by the sending node, preferably based on the channel quality feedbacks and other information such as channel predictions or scheduling requirements, and informing the receiving node about the retransmission part. Alternatively one or more of the above factors can be determined by the receiving node and comprised in the feedback as the determined CQI threshold, which implies the suggested retransmission selections.

It should be noted that if, for example, a different modulation or code rate is suggested for the retransmission, or if the predictions of the quality of a component gives indications that the transmission quality is sufficient at the moment, the coded bits associated with a bad part do not necessarily have to be moved to a new component.

The packet size in the retransmission depends on the quality measurement, the quality requirement and the channel, which provide an efficient combination of the link-adaptation of the re-transmission and the scheduling.

As described with reference to step 225, the determination of retransmission settings procedure will re-map the retransmitted coded bits to components with a component dependent modulation adaptation. Consequently, the receiving node needs, in the soft combining step 235, to perform a soft-bit combination instead of the symbol-combination in the conventional HARQ.

As indicated above, the signalling required for the HARQ scheme according to the invention will be dependent on how, and in which node, the identification of bad parts and the determination of retransmission settings, for example, will take place.

In the case of a predetermined quality threshold value, very limited extra signalling as compared to presently used schemes, is needed. The receiving node informs in the feedback the sending nodes of the BEI and possibly and preferably also of the received quality information as the channel quality indicators for each component. No further signalling is needed from the sending node to the receiving node in order for the receiving node to correctly interpret the retransmission, i.e. the second coded message block. The number of new coded bits can be derived based on the code rate and the modulation mode, scheduling signalling, together with the knowledge of the predetermined threshold, assuming the retransmitted coded bits always sent ahead of the new coded bits.

In the case of a dynamically determined quality threshold value, the threshold can either be determined by the sending node or by the receiving node. (a) When the sending node determines the threshold, a few more feedback bits from the receiving node to the sending node are required to inform the real decoded block information or quality in the receiver. In addition, the sending node needs a few more signalling bits to inform the receiving node about the threshold to recognize the retransmission part. (b) In another aspect, if the receiving node determines the retransmission settings, the receiving nodes needs a few more feedback bits to inform the sending node about the quality threshold value used to select bad parts that need to be retransmitted. No further signalling from the sending nodes to the receiving nodes is needed. However, such a method limits the flexibility of combining retransmission selection and the scheduler, but may still be advantageous to use in a case when channel strongly correlated among different transmission tries for the same packet. Since the receiving node, as the decision maker, will do the scheduling and link-adaptation for the coming re-transmission without knowing the channel quality, it has to assume the same channel quality as in the current transmission.

Therefore, a slightly higher signalling cost may be expected for the equalizing HARQ. The effects of the increased signalling cost can be mitigated in a number of ways:

Considering the frequency domain correlation, the component selection can be performed with a larger granularity, i.e. a unit of a plurality of components. With a wider minimum retransmission unit, the bad unit index will cause less signalling costs than the bad component index.

More elaborate signalling methods, e.g. the differentiated signalling, can be introduced to reduce the signalling cost. a) For example, the HARQ feedback can convey information about the index of the worst units/components in the $1^{st}$ retransmission. If that still does not enable correct decoding, the index of the second worst units/components is communicated to the sending node for the $2^{nd}$ retransmission. The decision is made by the receiving node.

b) Another example is to inform the transmitter about the quality level of the units/components, where the transmitter will make the re-transmission decision.

By retransmitting the most distorted parts of previous transmissions, the equalizing HARQ reduces the multi-state performance loss, corrects the systematic bit erasure problem automatically, and reduces the impact of channel estimation errors from bad parts.

An implementation, corresponding to an embodiment of the invention, utilizing OFDMA as the transmission technology, will be outlined as a non-limiting example. The components are in this case the time/frequency slots, or chunks, characteristic for the OFDMA-technique. As appreciated by the person skilled in the art the method can easily be adapted to, and utilized in, other systems using a plurality of components such as MC-CDMA and multi-stream multiple-input-multiple-output transmission technologies.

The steps of the method as described with reference to FIGS. 2 and 3 may preferably be adapted to OFDMA in the following ways:

205': The sending node 305 performs a first transmission of the first coded message block over a multiple OFDMA chunks to the receiving node 310.

210': If the receiving node in the decoding process the decoding of the first coded message block fails (BEI), a retransmission adaptation process will be initiated. The received first coded message block is stored by the receiving node. If no errors are detected the receiving node is ready for receiving further message blocks.

215': Upon the BEI-indication the receiving node identifies chunks in the first transmission that need to be retransmitted:

215'*a*: The receiving node performs chunk quality measurements and determines a quality indicator for each chunk. Possibly the chunks are sorted with respect to the quality indicators.

The coded bits in the chunks with the lowest quality should likely be retransmitted. Chunks associated with a quality indicator below a predetermined or dynamically determined threshold value are identified as bad chunks. The threshold value can be determined either by the receiving node or the sending node.

215'*b*: The sending node predicts the quality of individual chunks, for example based on previous transmissions and determines quality indicators for each chunk. The chunks associated with a predicted quality indicator below a predetermined or dynamically determined threshold value are identified as bad parts.

220': The receiving node feeding back information about a) selected chunks for retransmission, and preferably information on the quality of a plurality of the chunks, or b) an indication of a BEI and to which message block the BEI is associated with, in correspondence with the above described different alternatives.

225': The sending node determines retransmission settings. The relocation of coded bits from bad chunks to good chunks, the chunk selection, is at least partly based on the feedback and on scheduling considerations. Optionally new coded bits are included in the transmission. The retransmission settings also include the modulation mode depending on the channel quality prediction of the scheduled components.

230': The sending node retransmits the coded bits identified from previous steps.

235': Upon reception of the retransmission the receiving node performs a soft combining. Optionally soft values from very bad chunks may be excluded from the combining process in order to not degrade the result.

Figure 6A:
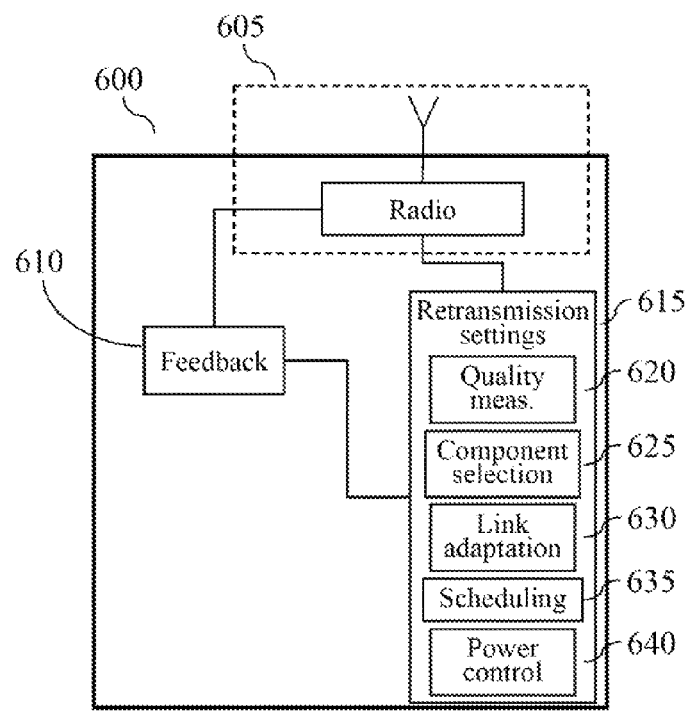
FIG. 6a and b schematically illustrates a sending and a receiving node according to the present invention.
Figure 6B:
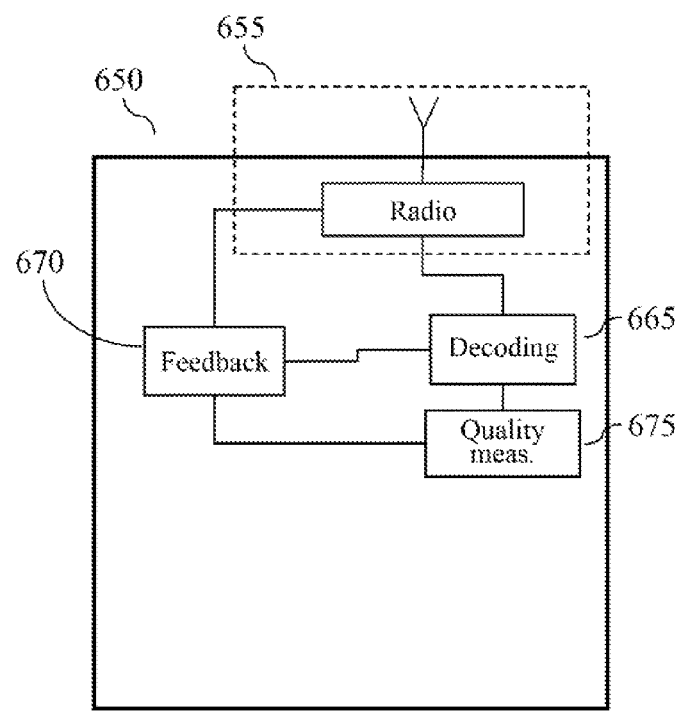

Arrangements according to the present invention in a sending and receiving node, respectively, suitable for effectuating the above described embodiments are schematically illustrated in FIGS. 6 *a* and 6*b*. The modules and blocks according to the present invention are to be regarded as functional parts of a sending and/or receiving node in a communication system, and not necessarily as physical objects by themselves. The modules and blocks are preferably at least partly implemented as software code means, to be adapted to effectuate the method according to the invention. The term "comprising" does primarily refer to a logical structure and the term "connected" should here be interpreted as links between functional parts and not necessarily physical connections.

However, depending on the chosen implementation, certain modules may be realized as physically distinctive objects in a receiving or sending node.

The sending node 600 comprises radio communication means 605, which provides the necessary functionalities for performing the actual reception and transmission of radio signals and is well known by the skilled person. According to the invention the sending node 600 is provided with a feedback reception module 610, arranged to receive feedback information from a receiving node. The feedback reception module is in connection with a retransmission settings module 615 which provides the radio communication means with transmission settings for a transmission. The retransmission settings module 615 may comprise, or be in communication with, sub-modules for channel quality measurements 620, component selection 625, Link adaptation 630, scheduling 635 and power control 640. These sub-modules are arranged to exchange information to provide an optimized retransmission setting.

The receiving node 650 comprises radio communication means 655, which provides the necessary functionalities for performing the actual reception and transmission of radio signals and is well known by the skilled person. In connection with the radio communication means 655 is a decoding module 665. According to the invention the receiving node 650 is provided with a feedback module 670, and according to one embodiment a channel quality measurement module 675. The decoding module 665 is arranged to be in connection with the feedback module 670 and provide an indication of block error (BEI) if a received coded message block could not be correctly decoded. The quality measurement module 675 is adapted to provide quality indicators for each component, either continuously, or on receiving a trigger from the decoding module 665 upon a BEI. The quality measurement module is additionally in connection with the feedback module 670, to provide the feedback module with information on the channel/component quality. The feedback module 670 is in connection with the radio communication means 655 and arranged to prepare feedback to a sending node, the feedback comprising a BEI and/or information of channel/component quality, for example.

A radio node, for example a mobile station, user equipment or radio base station, adapted for use in the described communication system, typically and preferably comprises both the receiving and sending functionalities and with them associated means. Hence, the above means in a receiving node and means in a sending node can be seen as different configurations in the same radio node corresponding to different modes of operation.

The method according to the present invention is preferably implemented by means of program products or program module products comprising the software code means for performing the steps of the method. The program products are preferably executed on a plurality of entities within a network. The program is distributed and loaded from a computer-usable medium, such as a USB memory, a CD, or transmitted over the air, or downloaded from the Internet, for example.

While the invention has been described in connection with what is presently considered to be the most practical and preferred embodiments, it is to be understood that the invention is not to be limited to the disclosed embodiments, on the contrary, is intended to cover various modifications and equivalent arrangements within the appended claims.

The invention claimed is:

1. A method of communication in a wireless communication system between a sending node and a receiving node, wherein the method comprises:
   receiving at a receiving node a first coded message block comprising a plurality of parts distributed over a plurality of components;
   detecting a decoding error associated with decoding the received first coded message block;
   in response to detecting the decoding error, identifying a part of the first coded message block that has probably contributed to the decoding error and a component associated with said part;
   feeding back to the sending node feedback information indicating that the first coded message block could not be correctly decoded, wherein the feedback information includes a suggested retransmission setting, and wherein the suggested retransmission setting comprises one or a combination of: a component selection setting, a link adaptation setting, a power control setting, and a scheduling setting; and
   receiving, at the receiving node, a second coded message block that includes selected parts of the first coded message block retransmitted by the sending node using retransmission settings based, at least in part, on the suggested retransmission setting.

2. The method of claim 1, wherein identifying a part of the first coded message block that has probably contributed to the decoding error comprises determining quality indicators for a plurality of the components used for the transmission of the first coded message block.

3. The method of claim 2, wherein identifying a part of the first coded message block that has probably contributed to decoding error comprise identifying a part of the first coded message block based, at least in part, on whether a quality indicator of a component associated with the identified part is below a quality threshold value.

4. The method of claim 2, wherein the quality indicators are based, at least in part, on quality measurements performed on the first coded message block or the radio signal associated with the first coded message block.

5. The method of claim 2, wherein the quality indicators are based, at least in part, on signal-and-interference-to-noise ratio (SINR) measurements.

6. The method of claim 2, wherein the quality indicators are based, at least in part, on symbol information rates.

7. The method of claim 2, wherein the quality indicators are based, at least in part, on channel quality predictions.

8. The method of claim 2, further comprising initiating a change in link adaptation if one or more of the quality indicators are below corresponding threshold values, and wherein the retransmission setting comprises a link adaptation setting.

9. The method of claim 1, wherein detecting the decoding error comprises detecting the decoding error based, at least in part, on cyclic redundancy check bits.

10. The method of claim 1, wherein detecting the decoding error comprises attempting to decode the received block using iterative decoders and using early stopping methods.

11. The method of claim 1, wherein the second coded message block includes coded bits that were not in the first coded message block.

12. The method of claim 1, further comprising combining information from the first coded message block and the second coded message block to facilitate the decoding of the first coded message block.

13. The method of claim 12, wherein combining the information comprises performing soft-bit combining.

14. The method of claim 13, further comprising selecting soft-bits of the first coded message block to be excluded from the combining based, at least in part, on the quality indicators of their associated components.

15. The method of claim 14, wherein selecting soft-bits to be excluded comprises selecting soft-bits to be excluded based, at least in part, on whether their associated components have quality indicators below an exclusion threshold value.

16. The method of claim 1, the wireless communication system utilizes orthogonal frequency division multiplexing for radio access.

17. A communication method in a sending node in a wireless communication system, the method comprising:
  transmitting from a sending node to a receiving node a first coded message block comprising a plurality of parts distributed over a plurality of components;
  receiving feedback information from the receiving node, the feedback information indicating that the first coded message block could not be correctly decoded, wherein the feedback information includes a suggested retransmission setting comprising one or a combination of: a component selection setting, a link adaptation setting, a power control setting, and a scheduling setting; and
  retransmitting a selected part of the first coded message block in a second coded message block to the receiving node using retransmission settings that are based, at least in part, on the suggested retransmission setting.

18. The method of claim 17, wherein the feedback information comprises explicit repeat request information identifying a part of the first coded message block that requires retransmission.

19. The method of claim 17, wherein receiving feedback information from the receiving node comprises receiving quality indicators for a plurality of the components used for transmission of the first coded message block.

20. The method of claim 19, wherein identifying a part of the first coded message block that requires retransmission comprises identifying a part of the first coded message block that requires retransmission based, at least in part, on whether a quality indicator of a component associated with the identified part is below a quality threshold value.

21. The method of claim 20, wherein the quality threshold value is determined based, at least in part, on information that has been provided to the sending node in the feedback.

22. The method of claim 20, further comprising transferring information regarding the quality threshold value to the receiving node to facilitate correct interpretation of the second coded message block by the receiving node.

23. The method of claim 19, further comprising identifying a part of the first coded message block that requires retransmission based, at least in part, on the received quality indicators.

24. The method of claim 19, wherein the quality indicators are based, at least in part, on quality measurements performed on the first coded message block or the radio signal associated with the first coded message block.

25. The method of claim 24, wherein the quality indicators are based, at least in part, on SINR measurements.

26. The method of claim 24, wherein the quality indicators are based, at least in part, on symbol information rates.

27. The method of claim 17, further comprising identifying a part of the first coded message block that requires retransmission based at least in part on quality indicators for a plurality of the components used for the transmission of the first coded message block, and wherein said quality indicators are based, at least in part, on channel quality predictions.

28. The method of claim 17, wherein the received retransmission setting comprises a link adaptation setting, and wherein retransmitting a selected part of the first coded message block comprises performing link adaptation based, at least in part, on the received link adaptation parameter.

29. The method of claim 17, wherein retransmitting a selected part of the first coded message block comprises performing link adaptation based, at least in part, on a predicted link adaptation parameter.

30. The method of claim 29, further comprising initiating a change in link adaptation if one or more quality indicators associated with the components used to transmit the first coded block are below corresponding threshold values.

31. The method of claim 17, wherein the second coded message block includes new coded bits that were not included in the first coded message block.

32. A communication method in a receiving node in a wireless communication system, the method comprising:
  receiving, at a receiving node, a first coded message block comprising a plurality of parts distributed over a plurality of components;
  detecting a decoding error associated with decoding the received first coded message block;
  in response to detecting the decoding error, identifying a part of the first coded message block for which retransmission will be requested and a suggested retransmission setting, wherein the suggested retransmission setting comprises one or a combination of: a component selection setting, a link adaptation setting, a power control setting, and a scheduling setting; and
  feeding back to the sending node feedback information indicating that the first coded message block could not be correctly decoded, wherein the feedback information indicates the identified part of the first coded message block and the suggested retransmission settings.

33. The method of claim 32, wherein feedback information comprises explicit repeat request information identifying parts of the first coded message block that require retransmission.

34. The method of claim 32, further comprising determining quality indicators for a plurality of the components used for the transmission of the first coded message block based, at least in part, on quality measurements performed on the first coded message block or the radio signal associated with the first coded message block.

35. The method of claim 34, wherein determining the quality indicators comprises determining the quality indicators based, at least in part, on signal-and-interference-to-noise ratio (SINR) measurements.

36. The method of claim 34, wherein determining the quality indicators comprises determining the quality indicators based, at least in part, on symbol information rates.

37. The method of claim 32, wherein identifying the part of the first coded for which retransmission will be requested comprises identifying the part based, at least in part, on whether a quality indicator of a component associated with that part is below a quality threshold value.

38. The method of claim 32, wherein a quality threshold value is included in the feedback to the sending node.

39. The method of claim 32, wherein a change in link adaptation is suggested if one or more quality indicators associated with the components are below corresponding threshold values.

40. The method of claim 32, further comprising combining information from the first coded message block and the second coded message block to facilitate the decoding of the first coded message block.

41. The method of claim 40, wherein combining the information comprises performing soft-bit combining.

42. The method of claim 41, further comprising selecting soft-bits of the first coded message block to be excluded from the combining based, at least in part, on the quality indicators of their associated components.

43. The method of claim 42, wherein selecting soft-bits to be excluded comprises selecting soft-bits to be excluded based, at least in part, on whether their associated components have quality indicators below an exclusion threshold value.

44. The method of claim 32, wherein detecting the decoding error comprises detecting the decoding error based, at least in part, on error detection decoding.

45. The method of claim 32, wherein detecting the decoding error comprises detecting the decoding error based, at least in part, on cyclic redundancy check bits.

46. The method of claim 32, wherein detecting the decoding error comprises attempting to decode the received block using iterative decoders and using early stopping methods.

47. A sending node adapted for use in a communication system, wherein the sending node is adapted for communication with at least a receiving node, wherein the sending node is configured to transmit to the receiving node a first coded message block comprising a plurality of parts distributed over a plurality of components, and wherein the sending node comprises:
   a feedback reception module configured to receive feedback information from the receiving node, the feedback information indicating that the first coded message block could not be correctly decoded, wherein the feedback information includes a suggested retransmission setting comprising one or a combination of: a component selection setting, a link adaptation setting, a power control setting, and a scheduling setting; and
   a retransmission settings module configured to determine retransmission settings and to select a part of the first coded message block to retransmit based, at least in part, on the feedback information received by the feedback reception module, wherein the sending node is further configured to retransmit the selected part of the first coded message block in a second coded message block using the retransmission settings.

48. The sending node of claim 47, wherein:
the feedback module is further configured to receive quality indicators associated with the components; and
the retransmission settings module is further configured to determine the retransmitting settings based, at least in part, on the quality indicators received by the feedback module.

49. The sending node of claim 47, wherein the retransmission settings module comprises, or is in connection with, a link adaptation module configured to determine link adaptation parameters suitable for a retransmission.

50. The sending node of claim 47, wherein the retransmission settings module comprises, or is in connection with, a channel quality measurements module configured to determine component quality indicators based, at least in part, on channel predictions.

51. A receiving node adapted for use in a communication system, wherein the receiving node is adapted for communication with at least a sending node, wherein the receiving node is configured to receive a first coded message block comprising a plurality of parts distributed over a plurality of components, the receiving node comprising:
   a decoding module configured to detect a decoding error associated with decoding the received first coded message block;
   a quality measurement module configured to identify a part of the first coded message block for which retransmission will be requested in response to the decoding module detecting the decoding error; and
   a feedback module configured to:
      identify a suggested retransmission setting, wherein the suggested retransmission setting comprises one or a combination of: a component selection setting, a link adaptation setting, a power control setting, and a scheduling setting; and
      feed back to the sending node feedback information indicating that the first coded message block could not be correctly decoded, wherein the feedback information indicates the identified part of the first coded message block and the suggested retransmission settings.

52. The receiving node of claim 51, wherein the feedback module is configured to provide explicit repeat request information based, at least in part, on the part identified by the quality measurement module.

53. The receiving node of claim 52, wherein the quality measurement module is configured to identify the part of the first coded message block for which retransmission will be requested by comparing a respective quality measurement for components associated with each of the parts with a quality threshold value.

* * * * *